UNITED STATES PATENT OFFICE.

EDWARD CALVIN KENDALL, OF ROCHESTER, MINNESOTA, ASSIGNOR TO UNIVERSITY OF MINNESOTA.

THYROID PRODUCT AND PROCESS OF PREPARING THE SAME.

1,392,767.    Specification of Letters Patent.    Patented Oct. 4, 1921.

No Drawing.    Application filed June 7, 1916. Serial No. 102,302.

*To all whom it may concern:*

Be it known that I, EDWARD C. KENDALL, a citizen of the United States, residing at Rochester, in the county of Olmsted and State of Minnesota, have invented a Thyroid Product and Process of Preparing the Same, of which the following is a specification.

This invention relates to a new product which possesses in high degree the physiologic properties of producing hyperthyroid symptoms, tachycardia, increase in metabolism with loss of weight, and increase in nervous irritability; the invention also pertains to a process of making said product by a suitable treatment of thyroid tissue.

In its purest form the new product is a substantially chemically pure carbon compound having a melting point of 220° C. (uncorrected), crystallizing in small needles which may combine in sheaf forms or needle crosses, and containing 60% of iodin. Its chemical reactions and products of decomposition indicate that it is an indole derivative containing two atoms of iodin.

The first important step in the process of isolating this new substance is the decomposition of the thyroid protein in such a way as to avoid breaking the iodin from its organic combination. This is accomplished by long continued boiling of the thyroid tissue in a very dilute alcoholic solution of a caustic alkali. The solution resulting from this treatment, after removing any undissolved thyroid tissue, contains several different organic compounds of iodin; almost half of the total iodin is in a form which is devoid of the characteristic physiological activity mentioned above.

The constituents of this solution which are soluble in barium hydroxid solution are separated from those that are insoluble; the insoluble portion, which contains some fatty bodies, is subsequently given a somewhat different treatment from the soluble portion. The latter is again divided into a portion which is soluble in an acid such as sulfuric acid, and a portion which is precipitated by this acid; the former portion is discarded, the subsequent steps of the process being directed to the gradual elimination of impurities from the acid insoluble portion which contains the desired active iodin compound.

The iodin compound in this insoluble portion (which portion will be referred to as the alpha constituents) appears to be chemically bound to some organic substance of unknown structure. The bond linking these two compounds is very stable in the presence of sodium hydroxid and various other reagents, but I have found that it is apparently very sensitive to carbon dioxid. When carbon dioxid is passed into a sodium or potassium carbonate solution of alpha constituents and barium chlorid is added, there is formed a precipitate which contains substances whose solubilities in barium or sodium hydroxid are different; whereas if the alpha constituents are dissolved in sodium or potassium hydroxid and the precipitation is brought about by the addition of a mineral acid, such as sulfuric or hydrochloric acid, an extraction of the precipitate with barium or sodium hydroxid does not effect any appreciable separation of the constituents. This peculiar action which is obtained with carbon dioxid is believed to be caused by the carboxyl group of the carbonic acid which is formed when the carbon dioxid is passed into the solution, and I consider the use of the simple water soluble carboxylic acids such as formic and acetic acid to come within the scope of my invention. The most successful method of isolating the active iodin compound is based upon the above observations.

The process in greater detail is as follows:

1. Desiccation and removal of all fat from the thyroids of hogs which are in a healthy condition.

The glands before desiccation should be trimmed free from all tissue other than the thyroid substance. Desiccation may be carried out at any temperature below 45° C. The fat should be extracted with a solvent which does not dissolve the iodin compound, such as benzin or petroleum ether.

2. Hydrolysis of the desiccated fat-free proteins of the thyroid.

2½ grams of desiccated fat-free thyroid is boiled under a reflux condenser for about 18 hours in 100 c. c. of an 85 per cent. by volume ethyl alcohol solution containing about 1 per cent. of sodium or potassium hydroxid and a small amount of zinc oxid. The container in which this is carried out should be of nickel or other material resistant to alkalis. This treatment effects the decomposition of the thyroid proteins into simpler constituents, the sulfur liberated from the cystine combining with the zinc.

3. Removal of alcohol insoluble constituents and recovery of the alcohol.

After the hydrolysis in alcohol has continued for 18 hours, water is added until the percentage of alcohol is reduced to 75 per cent., (by volume). The mixture is allowed to stand until cold, and the clear alcohol soluble constituents are then siphoned off. The lower portion of the container holds a mixture of zinc oxid, zinc sulfid and a residue of organic material resulting from the hydrolysis insoluble in 75 per cent. ethyl alcohol. This mixture is filtered on a suction filter and the residue after being washed with 75% alcohol is discarded. The alcohol is distilled from the siphoned portion and from the filtrate and condensed and is then immediately ready for reuse in step 2. The liquid remaining in the container is an aqueous solution of the protein-split products.

4. Separation of hydrolyzed constituents into two groups; group 1 being soluble in barium hydroxid; group 2 being insoluble in barium hydroxid.

The last traces of alcohol are removed by passing steam through the solution. Water is now added in such proportion that the total volume in cubic centimeters will numerically equal approximately six times the weight in grams of the thyroid originally taken, that is, for 500 grams of thyroid, the total volume at this point should be 3000 c. c. To this solution barium hydroxid $Ba(OH)_2 8H_2O$ is added in proportion of 30 grams per 100 grams of desiccated thyroid used. The solution is allowed to heat until the precipitate forms and settles to the bottom; the solution is then filtered. The precipitate which formed on the addition of barium is designated barium residue and may be denoted as "BaR." BaR consists of the barium soaps of the fatty acids resulting from the saponification of the fats, and also of certain constituents of the thyroid protein among which is one of the compounds containing iodin. The treatment of this BaR is given in step 13.

5. Removal of the barium from the barium soluble constituents of step 4.

Sodium sulfate is added to the filtrate from step 4, forming an insoluble compound—barium sulfate—which is filtered off. The filtrate consists of a mixture of protein-split products among which are found compounds containing iodin; some of these iodin compounds are soluble in acid and some are insoluble.

6. Separating the hydrolyzed products soluble in barium hydroxid solution into two groups—the alpha group, insoluble in sulfuric acid; and the beta group, soluble in sulfuric acid.

This is done by adding 20 per cent. sulfuric acid to the solution resulting from step 5, until no further precipitate is obtained by the addition of the acid. Although the beta group contains from 40 to 50 per cent. of the total iodin in the desiccated thyroid, it has been shown that this compound is without direct physiological activity, and I am not concerned with its isolation. The precipitate designated the alpha group contains approximately 25 per cent. of the total iodin. This first precipitate of the alpha group contains from 2 to 5 per cent. of iodin.

7. Treatment of the alpha constituents with carbon dioxid.

The alpha constituents from step 6 are dissolved in sodium or potassium carbonate containing a small amount of sodium or potassium hydroxid so that no excess of the carbonate is present after solution has taken place. The temperature during this step is kept below 30° C. A rapid stream of carbon dioxid gas is passed through the solution still maintained at a temperature below 30° for about three hours.

8. Separation of compounds into two groups—group 1, those precipitated by barium chlorid; group 2, those soluble after adding barium chlorid.

Barium chlorid is added to the solution from step 7 in amount five times as great as the carbonate used, precipitating almost everything. In some cases it is desirable to continue to pass carbon dioxid into the solution for about an hour after the barium chlorid has been added. The resulting mixture is filtered on a suction filter and after the filtrate has passed through, the suction flask is changed and the residue on the funnel is washed with distilled water. The distilled water filtrate, which may contain a little of the iodin compound, is saved and treated with hydrochloric acid and any precipitate is added to the next quantity of thyroid, which is being treated just before step 7.

9. Separation of compounds from step 8 into three groups—group 1, those soluble in barium hydroxid; 2—those insoluble in barium hydroxid, but soluble in sodium carbonate hydroxid; 3, those insoluble in barium hydroxid and sodium hydroxid, and carbonate. The term sodium carbonate hydroxid as used above and as used throughout the specification and claims is to be construed as meaning sodium hydroxid containing a small amount of sodium carbonate.

Steps 7 and 8 convert the compounds resulting from the hydrolysis of the thyroid into a precipitate which have three degrees of solubility: (1) a portion soluble in barium hydroxid which comprises a large amount of the coloring matter (yellow colored substance) and some of the iodin compound; (2) compounds soluble in sodium hydroxid and carbonate solution consisting mainly of the iodin compound and a large amount of the yellow colored impurities; (3) compounds insoluble in both sodium and barium hydroxids consisting mainly of dark brown colored impurities and a small portion of the iodin compound.

The barium hydroxid extract is obtained as follows:—The residue resulting from step 8 is placed in a suitable round bottom flask of 2 to 3 liters capacity. Barium hydroxid and about 1 liter of distilled water are added. A vigorous stream of steam is now passed through this solution. The steam breaks up the precipitate into small particles and the barium hydroxid dissolves certain constituents. Having passed the steam through the solution for about an hour, the solution is filtered. The barium hydroxid soluble compounds are somewhat purified by precipitating the barium with sodium sulfate. This carries down mechanically some of the impurities. The filtrate from this treatment contains all of the iodin compound dissolved by the barium hydroxid and also some excess sodium sulfate. Since the presence of sulfate would interfere with the subsequent treatment with carbon dioxid and barium chlorid the iodin compound is removed from the solution by precipitating it with sulfuric acid.

The residue from the barium hydroxid extraction is now returned to the same flask and is extracted with dilute sodium carbonate hydroxid in precisely the same manner, that is with a current of steam passing through the solution, and the solution is again filtered. The compounds having the second degree of solubility (that is, soluble in sodium carbonate hydroxid) are precipitated directly with sulfuric acid.

The compounds insoluble in both barium and sodium carbonate hydroxid are suspended in distilled water and precipitated from the barium carbonate by means of hydrochloric acid as described in step 10.

During the early stages of purification the three precipitates are to all intents and purposes nearly enough alike to be mixed together, but as the purification proceeds the extraction with barium hydroxid removes impurities which are a great aid in the purification of the iodin compound, which is soluble in sodium carbonate hydroxid but not very soluble in barium hydroxid. Also at this stage of the purification the compounds insoluble in both barium and sodium carbonate hydroxid form the bulk of the impurities separated at this step. Under these conditions it is not advisable to mix the three precipitates together, but they are kept separate and in case the quantity is small, it is simply held until another batch of the thyroid is worked up to the same stage, when they are combined.

10. Treatment of the barium-sodium carbonate hydroxid insoluble compounds.

These hydroxid-insoluble compounds are suspended in distilled water and the barium carbonate removed by treatment in hydrochloric acid. This also dissolves a portion of the dark colored impurities and effects a partial purification of the iodin compound which is present in this fraction and which remains in the residue. The insoluble compounds after this treatment are dissolved in sodium or potassium carbonate, the solution is filtered, removing compounds insoluble in carbonate and this solution is then treated precisely as described under step 7.

11. Continued purification of the barium and sodium carbonate hydroxid soluble compounds until the crystalline form of the iodin compound is obtained.

The precipitates obtained as described under step 9 are dissolved in potassium carbonate containing a small amount of potassium hydroxid and treated precisely as described under step 7 until the solutions of barium and sodium carbonate hydroxid soluble compounds are practically colorless. Under this condition most of the iodin compound will be found among the sodium carbonate hydroxid soluble compounds. The precipitate will be white and flocculent. When this stage is reached, the solution is made distinctly acid with sulfuric acid and it is heated on the water-bath until the precipitate collects together and settles at the bottom of the beaker. The solution is cooled and the precipitate removed by filtering.

12. Purification of the iodin compound by solution in alcohol and precipitation by sodium acetate.

The white precipitate obtained by step 11 is treated with 95 per cent. alcohol on the water-bath; a portion of the substance will go into solution. These are the impurities and may be removed by simply decanting the solution, leaving an insoluble residue in the bottom of the beaker. More alcohol and a very small amount of hydrochloric acid is now added. The alcohol is heated on the water-bath until solution is complete. Sodium acetate is now added in amount sufficient to equal the hydrochloric acid present and furnish a considerable excess of sodium acetate. The beaker is covered with a glass and allowed to stand an hour or two on the water-bath. During this time the compound will crystallize out of the solution in the form of very fine curved needles. This compound contains about 60% of iodin. If it is desired to carry the purification further this may be done by dissolving in sodium hydroxid and reprecipitating by the addition of an ammonium salt (sulfate or chlorid). On boiling the compound reprecipitates in microscopic needles.

The portion soluble in the alcohol and the alcohol filtrate from the sodium acetate treatment are combined. The alcohol is evaporated off. The residue is taken up in sodium carbonate and then treated as described under step 7.

13. Treatment of the barium insoluble compounds obtained by adding barium hydroxid to the first aqueous solution of the hydrolyzed products—see step 4.

The precipitate of barium insoluble compounds is suspended in distilled water, to which are added some sodium hydroxid and sodium sulfate. Steam is passed through the solution to effect agitation until the barium salts have been decomposed and the barium precipitated as sulfate. Alcohol is added in amount equal to half the volume of the solution while it is still hot and the precipitate of barium sulfate and other impurities are allowed to settle to the bottom. The alcoholic solution containing the sodium salts of the compounds which were precipitated as barium salts is either decanted or filtered off, the alcohol is evaporated and the compounds are precipitated with sulfuric acid.

14. Removal of fatty acids from the barium insoluble compounds.

The precipitate obtained in step 13 is mixed with infusorial earth and dried in the air at a temperature below 30° until most of the water is evaporated. It is then broken up into small particles and shaken with gasolene. Three successive treatments of gasolene will remove most of the fatty acids. A final treatment with petroleum ether will remove most of the gasolene and the last traces of free fatty acids. The residue is dried thoroughly in a desiccator, ground to a fine powder, placed in an extraction thimble and extracted with petroleum ether. The fat-free material is now dissolved in sodium hydroxid under conditions which will minimize the amount of silicic acid dissolved from the infusorial earth. The solution is precipitated with sulfuric acid. At this point if there are evidences of free fatty acids still remaining, the precipitate is dried and another extraction made with petroleum ether.

15. Treatment of the compounds resulting from step 14 with carbon dioxid.

This step is precisely the same as step 7. The compounds resulting from the three groups of steps 7, 8 and 9, are to be treated the same as the compounds resulting from steps 7, 8 and 9 obtained from the barium soluble compounds of step 4.

Prepared in this way the substance is very nearly white and under the microscope it appears as small needles which may combine in sheaf forms or needle crosses. Under some conditions the needles may grow and present almost a platellete form. The melting point of this substance is about 220° (uncorrected). It is easily soluble in sodium and potassium hydroxid, slightly soluble in ammonium and barium hydroxids. When in the dry condition it is very difficultly soluble in sodium, ammonium or potassium carbonate. It may be precipitated from a sodium hydroxid solution by passing carbon dioxid through the solution. It is very nearly insoluble in alcohol, ether, acetone, petroleum ether and benzol. It is soluble in alcohol containing hydrochloric acid. When reduced in acid solution with zinc and sulfuric acid the solution gives a pink color with the Hopkins-Cole reaction, (glyoxylic and sulfuric acids) which is apparently produced by the presence of an indol derivative. The substance fused with sodium dyroxid gives an odor strongly suggestive of indol and the solution resulting from the fusion gives an indol reaction.

The physiological activity of this substance is shown by an increased pulse rate, increased metabolism and all the typical and well known physiological effects of desiccated thyroid. It will relieve the symptoms of myxedema and cretinism. In its administration it may be diluted with suitable admixtures milk sugar, starch, cane sugar, and the like. Its dosage varies with the individual, but the limits are between $\frac{1}{8}$ to 2 mg. per day, for the condition of cretinism and myxedema. In cases of obesity the amount used may be increased to 4 or 5 mg. per daily dose.

It is not necessary, in order to obtain a valuable product having the characteristic physiological activity of the thyroid, to carry out the last few purification steps, since in partly purified products containing for instance 20 or 30% of iodin, the impurities may be comparatively unobjectionable and may act merely as diluents. The extent to which the purification is carried will depend upon circumstances, a product containing from 50 to 60% of iodin being in many cases sufficiently pure. The pure substance has of course this great advantage, that the doses or mixture made therefrom can be prepared and standardized with the greatest accuracy.

I claim:—

1. A process of breaking down thyroid tissue which comprises heating desiccated substantially fat-free thyroid tissue with about from 80 to 95% (by volume) ethyl alcohol containing about from 1 to 2½% of sodium or potassium hydroxid and a small amount of zinc oxid, until decomposition of the thyroid proteins into more simple constituents is effected.

2. A process of breaking down thyroid tissue which comprises boiling 2½ parts of desiccated substantially fat-free thyroid tissue for about eighteen hours with about 100 parts of 85% (by volume) ethyl alcohol containing 1% of sodium or potassium hydroxid and a small amount of zinc oxid.

3. A process of treating thyroid tissue which comprises hydrolyzing said tissue with an alcohol solution containing a small amount of an alkali-metal hydroxid, removing the alcohol and insoluble matter from the resulting mixture and the remaining solution being then treated by adding barium hydroxid or a soluble barium compound.

4. A process of treating thyroid tissue which comprises hydrolyzing said tissue with an alcohol solution containing a small amount of an alkali-metal hydroxid, removing the alcohol and insoluble matter from the resulting mixture, the remaining solution being then treated by adding barium hydroxid to precipitate some of the constituents, filtering the mixture, removing barium from the filtrate and adding a dilute mineral acid to the resulting barium-free solution to separate the constituents into an acid-soluble group and an acid-insoluble group.

5. A process of treating thyroid tissue which comprises hydrolyzing desiccated substantially fat-free thyroid tissue with a 1 or 2% alcoholic solution of sodium or potassium hydroxid, removing the alcohol and insoluble matter from the resulting mixture, the remaining solution being then treated by adding barium hydroxid, filtering the mixture, removing barium from the filtrate, adding dilute sulfuric acid to the barium-free filtrate to precipitate the acid-insoluble constituents, separating the precipitate from the solution, dissolving said precipitate in a dilute aqueous solution of sodium or potassium carbonate, passing carbon dioxid into the resulting solution, adding barium chlorid, separating the resulting precipitate, and extracting this last mentioned precipitate first with a barium hydroxid solution and then with a sodium carbonate hydroxid solution.

6. In the process of preparing a physiologically active substance from thyroid tissue, the step which comprises treating with a soluble barium compound an aqueous solution of the water soluble products resulting from the hydrolysis of thyroid protein.

7. In the process of preparing a physiologically active substance from thyroid tissue, the step which comprises treating with a dilute mineral acid the water soluble, barium hydroxid soluble products resulting from the hydrolysis of thyroid protein.

8. In the process of preparing a physiologically active substance from thyroid tissue, the step which comprises treating with 20% sulfuric acid the water soluble, barium hydroxid soluble products resulting from the hydrolysis of thyroid protein.

9. In the process of preparing a physiologically active substance from thyroid tissue, the step which comprises treating with carbon dioxid a solution of a portion, containing said active substance, of the products of hydrolysis of thyroid protein.

10. In the process of preparing a physiologically active substance from thyroid tissue, the step which comprises treating with a water soluble carboxylic acid a solution of that fraction of the products of hydrolysis of thyroid protein which contains said active substance.

11. In the process of preparing a physiologically active substance from thyroid tissue, the purification step which comprises treating at a suitable temperature with carbon dioxid a solution of a water-soluble, barium hydroxid-soluble, sulfuric acid-insoluble material separated from the products of hydrolysis of thyroid protein.

12. In the process of preparing a physiologically active substance from thyroid tissue, the purification step which comprises treating at a suitable temperature with carbon dioxid and barium chlorid at a temperature below 30° C. a dilute sodium or potassium carbonate solution of a water-soluble, barium hydroxid-soluble, sulfuric acid-insoluble material separated from the products of hydrolysis of thyroid protein.

13. In the process of preparing a physiologically active substance from thyroid tissue, the purification steps which comprise treating with carbon dioxid and barium chlorid at a temperature below 30° C. a dilute sodium or potassium carbonate solution of a water-soluble, barium hydroxid-soluble, sulfuric acid-insoluble substance separated from the products of hydrolysis of thyroid protein, extracting the resulting precipitate first with a barium hydroxid solution and then with a sodium carbonate hydroxid solution, and repeating the treatment with carbon dioxid and the extractions with barium and sodium hydroxids until the active substance extracted by said hydroxids has the desired degree of purity.

14. In the process of preparing a physiologically active substance from thyroid tissue, the purification steps which comprise treating with carbon dioxid and barium chlorid at a temperature below 30° C. a dilute sodium or potassium carbonate solution of a water-soluble, barium hydroxid-soluble, sulfuric acid-insoluble substance separated from the products of hydrolysis of thyroid protein, extracting the resulting precipitate first with a barium hydroxid solution and then with a sodium carbonate hydroxid solution, removing the barium from the barium hydroxid extract by precipitating it with sodium sulfate and filtering, acidifying the filtrate and also the sodium hydroxid extract to precipitate the organic constituents, filtering off the solution, dissolving the residue in dilute sodium or potassium carbonate, repeating the steps above outlined until the hydroxid extracts are practically colorless, acidifying the colorless extracts with sulfuric acid and heating until the precipitate settles, separating the precipitate, dissolving it in about 95% alcohol containing a very small amount of hydrochloric acid, adding sodium acetate, allowing the solution to stand until the substantially pure active substance crystalizes, dissolving the crystals in sodium hydroxid solution and reprecipitating the active substance in its purest form by adding ammonia sulfate or chlorid and boiling.

15. In the process of preparing a physiologically active substance from thyroid tissue, the steps which comprise heating with a dilute aqueous solution of sodium hydroxid and sodium sulfate the water-soluble products of hydrolysis of thyroid protein which have been precipitated with barium hydroxid, until the barium is precipitated as sulfate, adding alcohol, filtering, evaporating the alcohol from the filtrate, acidifying the remaining solution to form a precipitate mixing the latter with infusorial earth, extracting the mixture with gasolene, drying the residue and extracting it with petroleum ether, separating the fat-free organic substances from the infusorial earth by extracting the ether-extracted residue with dilute sodium hydroxid, and acidifying the resulting extract to form a precipitate from which the active substance may be isolated by repeatedly dissolving in potassium carbonate, precipitating with carbon dioxid and barium chlorid and extracting the resulting precipitate with barium and sodium carbonate hydroxid solutions.

16. In the process of preparing a physiologically active iodin-containing substance from thyroid tissue, the steps of removing fatty acid compounds from barium hydroxid-insoluble products of hydrolysis of thyroid protein which comprises mixing said products with an inert finely divided material and extracting the mixture with a liquid which is a solvent for fats but a non-solvent for the iodin-containing substances.

17. In the process of preparing a physiologically active iodin-containing substance from thyroid tissue, the steps of removing fatty acid compounds from barium hydroxid-insoluble products of hydrolysis of thyroid protein which comprises mixing said products with infusorial earth, drying the mixture, extracting the dried mixture with gasolene, drying the residue and extracting it with petroleum ether.

18. In the process of preparing a physiologically active iodin-containing substance from thyroid tissue, the steps of removing fatty acid compounds from barium hydroxid-insoluble products of hydrolysis of thyroid protein which comprises mixing said products with an inert finely divided material, extracting the mixture with a liquid which is a solvent for fats but a non-solvent for the iodin-containing substances, treating the residue with dilute sodium carbonate hydroxid solution to dissolve said substances and separating the solution from the undissolved finely divided material.

19. The process of separating the active substance of the thyroid from small remaining amounts of associated impurities which comprises dissolving a material composed mainly of said active substance in about 95% ethyl alcohol containing a small amount of hydrochloric acid, adding sodium acetate, and allowing the resulting solution to stand until the substantially pure active substance crystallizes out.

20. The process of separating the active substance of the thyroid from small remaining amounts of associated impurities which comprises extracting a material composed mainly of said active substance with about 95% alcohol, dissolving the residue in about 95% ethyl alcohol containing a small amount of hydrochloric acid, adding sodium acetate, and allowing the resulting solution to stand until the substantially pure active substance crystallizes out.

21. The process of removing the last traces of impurities which may be associated with the active substance of the thyroid obtained by a process like that stated in claims 18 and 21 which comprises dissolving the slightly impure active-substance in a dilute sodium hydroxid solution, adding ammonium sulfate or chlorid and boiling to precipitate the pure active substance in the form of microscopic needles.

22. The herein-described product, obtained from thyroid tissue, practically free from inert gland tissue which comprises essentially a substance containing substantially 60% of organically bound iodin and possessing the physiological properties of producing tachycardia, and increasing metabolism and nervous irritability.

23. The herein-described, obtained from thyroid tissue, product containing from 20 to 60% of organically bound iodin and possessing the physiological properties of producing tachycardia and increasing metabolism and nervous irritability.

24. An organic substance containing 60% of iodin, having a melting point, uncorrected, of 220° C., crystallizing from its solution in small needles, being insoluble in alcohol, ether and aqueous acids, and soluble in caustic alkali carbonate solutions and in alcohol containing hydrochloric acid, and possessing in superior degree the physiological characteristics of the thyroid gland tissue.

In testimony whereof I have hereunto set my hand in the presence of two subscribing witnesses.

EDWARD CALVIN KENDALL.

Witnesses:
C. E. KNOWLES,
W. C. TUBBS.